(12) United States Patent
Person

(10) Patent No.: US 7,703,399 B2
(45) Date of Patent: Apr. 27, 2010

(54) PACKAGE, PALLETIZED LOAD, AND METHOD OF FORMING THE SAME

(75) Inventor: Donald L. Person, Elwood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 891 days.

(21) Appl. No.: 11/495,690

(22) Filed: Jul. 31, 2006

(65) Prior Publication Data

US 2008/0023107 A1     Jan. 31, 2008

(51) Int. Cl.
*B65B 35/50* (2006.01)
(52) U.S. Cl. ............... 108/53.1; 206/503; 414/789.4; 414/792; 53/540; 53/542; 53/544
(58) Field of Classification Search ............ 108/51.11, 108/53.1, 53.3, 53.5, 91; 206/321, 322, 443, 206/503; 414/798.4, 792; 53/443, 446, 447, 53/540, 542, 544
See application file for complete search history.

(56) References Cited

U.S. PATENT DOCUMENTS

| 1,955,833 | A | * | 4/1934 | Romanoff | ............... | 428/119 |
| 5,568,774 | A | * | 10/1996 | Hutchison | ............... | 108/51.3 |
| 6,332,535 | B1 | * | 12/2001 | Usui et al. | ............... | 206/386 |
| 6,470,649 | B2 | * | 10/2002 | Usui et al. | ............... | 53/449 |

* cited by examiner

*Primary Examiner*—Shelley Self
(74) *Attorney, Agent, or Firm*—Law Offices of Steven W. Weinrieb

(57) ABSTRACT

A package or palletized load comprises a lower section of elongated articles which are disposed in a side-by-side abutting array and are upended so as to be supported upon one of the longitudinally extending side surfaces thereof. Additional elongated articles, disposed in an array comprising multiple rows and columns and forming an upper section of the package or palletized load, are then stacked atop the lower section of the package or palletized load. Due to the fact that the articles comprising the lower section of the package or palletized load are relatively inflexible along their transverse extents, the elongated articles disposed within the upper section of the package or palletized load will be properly supported so as not to be adversely affected by means of gravitational forces to which the multiplicity of elongated articles will be subjected during shipping, handling, transportation, and storage.

20 Claims, 2 Drawing Sheets

//!// # PACKAGE, PALLETIZED LOAD, AND METHOD OF FORMING THE SAME

FIELD OF THE INVENTION

The present invention relates generally to package structures, palletized loads, and a method of forming the same, and more particularly to a new and improved package, palletized load, and a method for forming the same, which comprises the formation of a bottom layer of elongated lumber products or boards in which a multiplicity of such elongated lumber products or boards are disposed in a side-by-side abutting array wherein the multiplicity of the elongated lumber products or boards are not disposed flat, that is, they are not disposed upon either one of their primary, longitudinally extending upper or lower surface portions, but to the contrary, are effectively disposed in an upended manner so as to be supported by or upon the lower or bottom, longitudinally extending side surfaces thereof. Additional elongated lumber products or boards are then stacked or disposed atop the aforenoted bottom layer of such elongated lumber products or boards, in an array comprising multiple rows and columns, wherein primary, longitudinally extending upper or lower surface portions of such additional elongated lumber products or boards are seated and supported upon the upper or top, longitudinally extending side surfaces of the bottom layer of the elongated lumber products or boards. In this manner, due to the fact that the aforenoted bottom layer of the elongated lumber products or boards are relatively inflexible along their transverse widths or extents, as defined between their oppositely disposed side surfaces thereof, the multiplicity of stacked elongated lumber products or boards, comprising the elongated lumber products or boards disposed within the upper array of rows and columns, are properly supported so as not to be adversely affected by means of gravitational forces to which the multiplicity of elongated lumber products or boards will be subjected during shipping, handling, transportation, or storage.

BACKGROUND OF THE INVENTION

In connection with the formation of packages or palletized loads comprising elongated articles, such as, for example, lumber products, and more particularly, elongated wooden boards used for constructing decks or similar structures, it is often the case that the boards are shipped, handled, transported, and subsequently stored, in accordance with well-known, conventional techniques or arrangements wherein the boards will be subjected, for example, to gravitational forces which will act along the longitudinal extents of the boards so as to tend to cause the boards to droop or sag at, for example, longitudinally central portions thereof. Still further, it is a significant problem within the wood or lumber industry that such prolonged sagging or drooping of the boards over extended periods of time, such as, for example, during shipping, handling, transporation, and storage of the boards, will tend to induce permanent warpage or deformation into the boards thereby rendering them, at worst, totally unsuitable for their intended usage, or at best, difficult to work with in connection with the construction of, for example, deck or similar structures.

A need therefore exists in the art for a new and improved arrangement or technique for arranging packages or palletized loads of such elongated lumber products or boards, in preparation for the shipping, handling, transportation, and storage of the same, wherein, for example, the elongated lumber products or boards will in fact be adequately supported throughout the entire longitudinal extents or lengths thereof such that the elongated lumber products or boards will not in fact be adversely affected by such gravitational forces acting thereon. Accordingly, the elongated lumber products or boards will not experience sagging or drooping along the longitudinal lengths or extents thereof, particularly at or within the longitudinally central portions thereof, so as not to, in turn, experience permanent warpage or deformation which would otherwise render the elongated lumber products or boards useless or at least substantially difficult to use.

SUMMARY OF THE INVENTION

The foregoing and other objectives are achieved in accordance with the teachings and principles of the present invention through the provision of a new and improved package, palletized load, and a method for forming the same, which comprises the formation of a bottom layer of elongated lumber products or boards in which a multiplicity of such elongated lumber products or boards are disposed in a side-by-side abutting array. In addition, and more particularly, the multiplicity of the elongated lumber products or boards are not disposed flat, that is, they are not disposed upon either one of their primary, longitudinally extending upper or lower surface portions, but to the contrary, are effectively disposed in an upended manner so as to be supported by or upon the lower or bottom, longitudinally extending side surfaces thereof.

Additional elongated lumber products or boards are then stacked or disposed atop the aforenoted bottom layer of such elongated lumber products or boards, in an array comprising multiple rows and columns, wherein primary, longitudinally extending upper or lower surface portions of such additional elongated lumber products or boards are seated and supported upon the upper or top, longitudinally extending side surfaces of the bottom layer of the elongated lumber products or boards. In this manner, due to the fact that the aforenoted bottom layer of the elongated lumber products or boards are relatively inflexible along their transverse extents or widths, as defined between the oppositely disposed side surfaces thereof, the multiplicity of stacked elongated lumber products or boards, comprising the elongated lumber products or boards disposed within the upper array of rows and columns, are properly supported so as not to be adversely affected by means of gravitational forces to which the multiplicity of elongated lumber products or boards will be subjected during shipping, handling, transportation, and storage.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
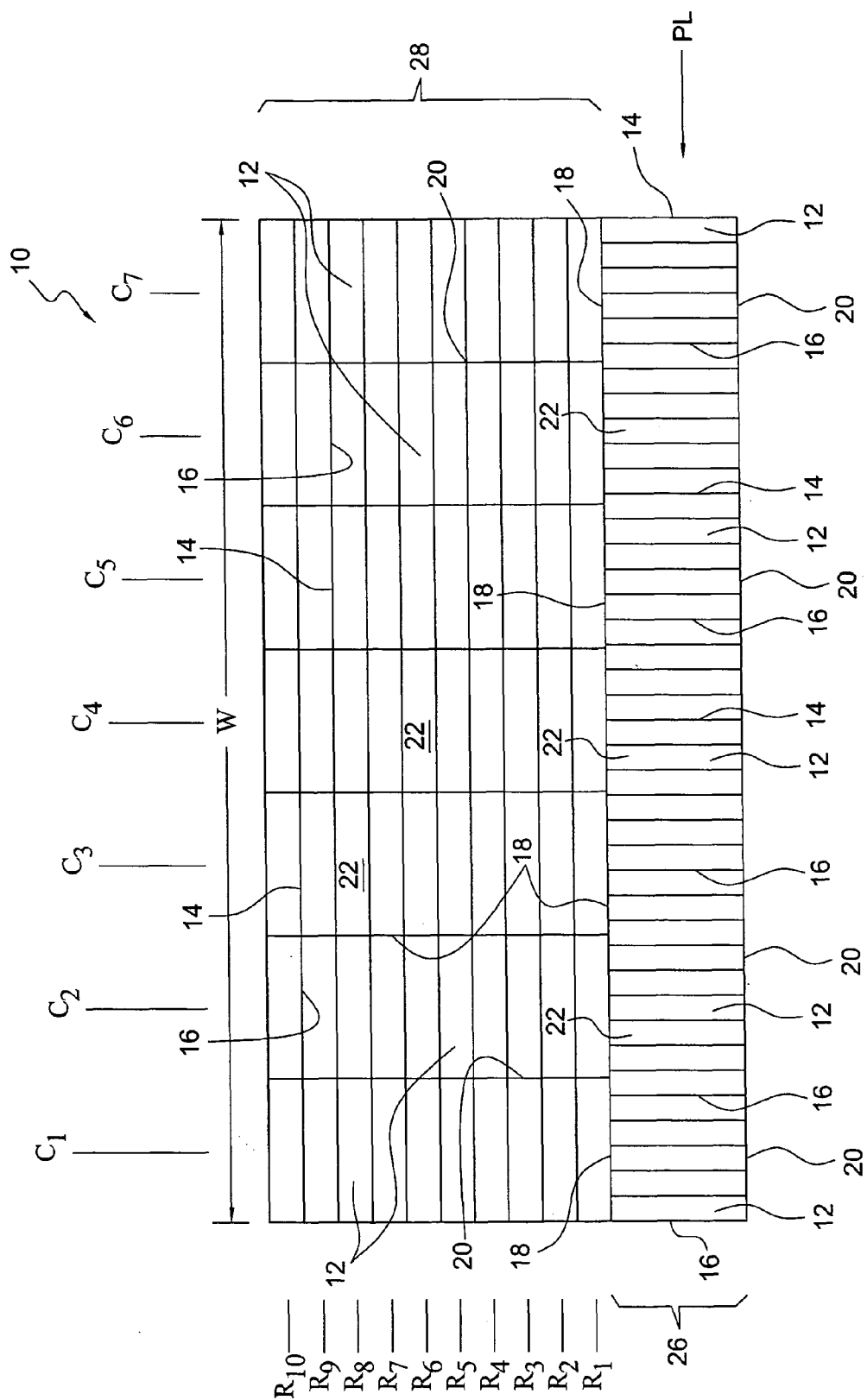
FIG. 1 is a schematic end elevational view of a new and improved package or palletized load, comprising a plurality of elongated articles, such as, for example, wooden lumber products or boards, which has been constructed in accordance with a new and improved, unique arrangement or array of such elongated articles, developed in accordance with the principles and teachings of the present invention, wherein a bottom layer of a multiplicity of the elongated articles are disposed in a side-by-side abutting array with the multiplicity of the elongated lumber products or boards being effectively disposed in an upended manner so as to be supported by or upon the lower or bottom, longitudinally extending side surfaces thereof, and wherein additional elongated lumber products or boards are then disposed or stacked atop the aforenoted bottom layer of such elongated lumber products or boards, in an array comprising multiple rows and columns, wherein primary, longitudinally extending upper or lower surface portions of such additional elongated lumber products or boards are seated and supported upon the upper or top, longitudinally extending side surfaces of the bottom layer of the elongated lumber boards or products whereby the multiplicity of stacked elongated lumber products or boards are properly supported so as not to be adversely affected by means of gravitational forces to which the multiplicity of elongated lumber products or boards are nevertheless subjected during shipping, handling, transportation, and storage.
Figure 2:
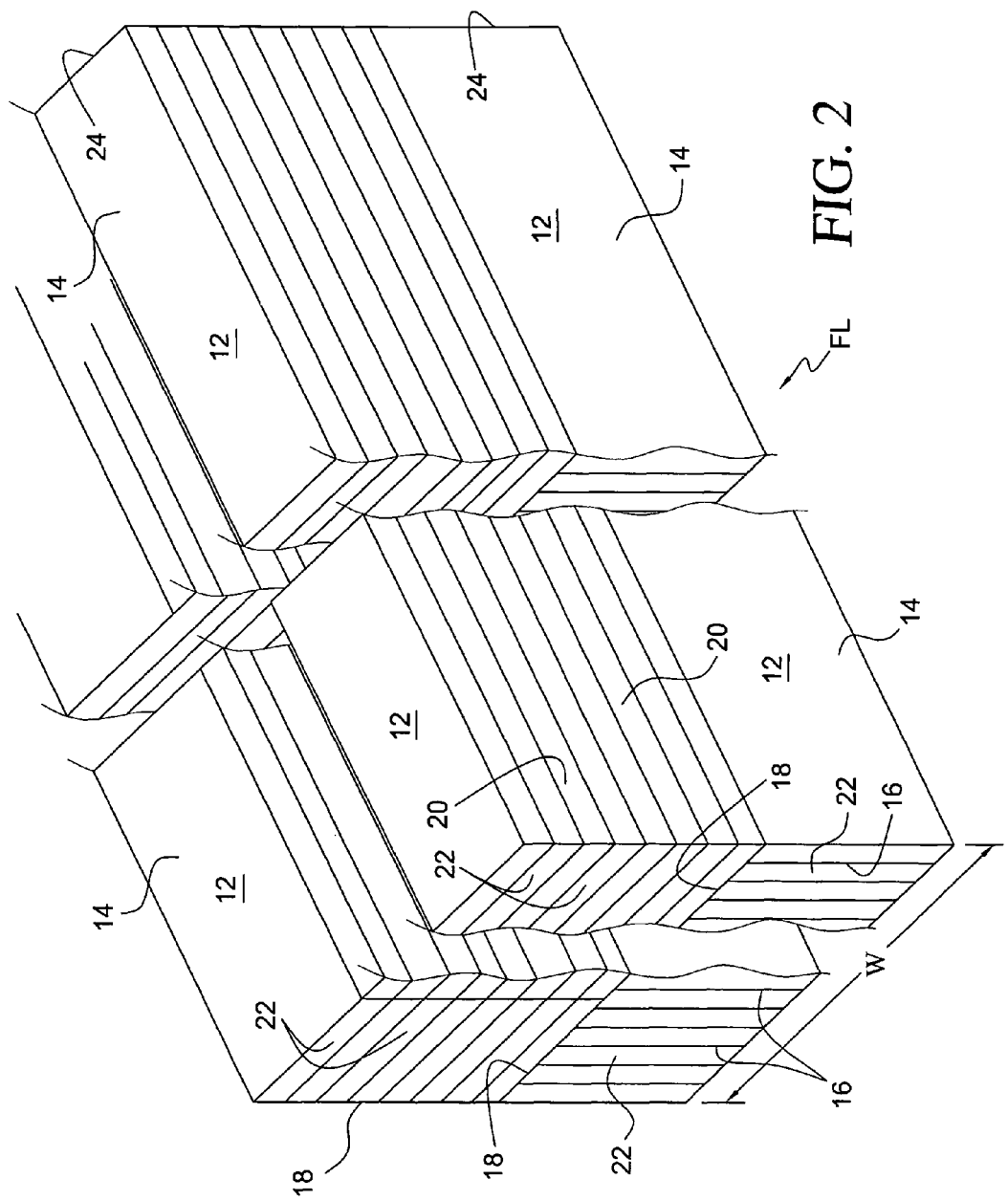
FIG. 2 is a perspective view of the new and improved package, palletized load, array, and arrangement of the elongated articles or products as disclosed within FIG. 1.

Referring now to the drawings, and more particularly to FIGS. 1 and 2 thereof, a new and improved, unique arrangement or array of a plurality of elongated articles or products, such as, for example, lumber boards, which may be used, for example, in order to construct wood deck structures or the like, wherein the arrangement or array of the plurality of elongated articles or products has been developed in accordance with the principles and teachings of the present invention in order to effectively form or define a new and improved package or palletized load structure, is disclosed and is generally indicated by the reference character 10. As has been noted hereinbefore, when shipping, handling, transporting, or storing elongated articles or products, such as, for example, lumber boards or products, it is important that the plurality of boards or products 12 be adequately supported such that the elongated articles or products 12 do not exhibit drooping or sagging at longitudinally central regions thereof which would therefore impart substantially permanent warpage or deformation into such articles or products 12 thereby rendering the same totally useless at worst or difficult to handle and use at best.

Therefore, in accordance with the principles and teachings of the present invention, it is seen that the new and improved unique arrangement or array of the plurality of elongated articles or products 12, developed in accordance with the principles and teachings of the present invention, forms or results in the formation of the new and improved package or palletized load 10 of the present invention. More particularly, the plurality of elongated articles or products 12 may comprise, for example, lumber products, boards, or the like, having dimensions of, for example, one inch (1.00") in depth, six inches (6.00") in width, and twenty feet (20.00') in length, and it is therefore further appreciated that each one of the plurality of elongated articles, boards, or products 12 comprises a substantially rectangular parallelepiped defined by means of an upper or top surface 14, an oppositely disposed lower or bottom surface 16, a pair of oppositely disposed, longitudinally extending, laterally spaced left and right side surfaces 18,20, and a pair of oppositely disposed, transversely oriented, longitudinally spaced front and rear end surfaces 22,24. Continuing still further, it is also appreciated that in accordance with the principles and teachings of the present invention, a first lower set 26 of a plurality of the elongated articles, products, or boards 12, which as will be more fully appreciated hereinafter will effectively serve as a foundation for the package or palletized load 10, is effectively formed as a result of the plurality of the elongated articles, boards, or products 12 being disposed in an upended, abutting, surface-to-surface arrangement.

More particularly, the plurality of the elongated articles, boards, or products 12 are disposed in such a manner that the lower or bottom surface 16 of one of the elongated articles, boards, or products 12 is disposed in contact with the upper or top surface 14 of an adjacent article, board, or product 12, and still further, that each one of the elongated articles, boards, or products 12 is supported upon, for example, its longitudinally extending right side surface 20. It can therefore of course be readily appreciated that, due to the fact that all of the elongated articles, boards, or products 12, comprising the aforenoted foundation or lower set 26 of elongated articles, boards, or products 12 of the package or palletized load 10, are relatively inflexible along their transverse extents or widths which are now oriented vertically and which are defined between their oppositely disposed longitudinally extending left and right side surfaces 18,20, such an array or set 26 of elongated articles, boards, or products 12 will be able to effectively resist any substantial bending forces which will effectively be impressed thereon such as, for example, when the entire arrangement, array, package, or palletized load 10 is adapted to be lifted by means of suitable apparatus, such as, for example, forklift apparatus, not shown. The forklift apparatus will approach the entire arrangement, array, package, or palletized load 10 from a position which is substantially perpendicular to the longitudinal extent of the entire array, arrangement, package, or palletized load 10, as illustrated by means of arrow FL, and is adapted to engage the entire arrangement, array, package, or palletized load 10 at a longitudinally central region thereof. In fact, as a result of the entire arrangement, array, package, or palletized load 10 being constructed in accordance with the teachings and principles of the present invention, the amount of bending that, for example, the opposite ends of the entire arrangement, array, package, or palletized load 10 experiences under such forklift lifting or hoisting conditions, is approximately one inch (1.00"), whereas the amount of bending experienced by means of the opposite ends of a conventional arrangement, array, package, or palletized load, that is, an arrangement, array, package or palletized load that does not comprise, for example, the foundation set 26 of upended elongated articles, boards, or products 12, is approximately three feet (3.00').

Continuing still further, it is seen that the first lower set 26 of the elongated articles, boards, or products 12, which is disposed in the aforenoted upended manner such that each one of the elongated articles or products 12 is supported upon its longitudinally extending right side surface 20 thereof, comprises, for example, forty (40) elongated articles, boards, or products 12, and since the depth of each one of the elongated articles, boards, or products 12, as measured between its upper or top surface 14 and its lower or bottom surface 16, is approximately one inch (1.00"), the entire arrangement, array, package, or palletized load 10 has a width dimension W of at least forty inches (40.00") or approximately three and one-half feet (3.50'). In addition to the first lower set 26 of the elongated articles, boards, or products 12 effectively forming the lower or foundation section of the entire overall arrangement, array, package, or palletized load 10, a second upper set 28 of elongated articles, boards, or products 12, comprising an upper section of the entire overall arrangement, array, package, or palletized load 10, is adapted to be disposed atop the first lower or foundation set 26 of elongated articles, boards, or products 12.

More particularly, the plurality of elongated articles, boards, or products 12, comprising the second upper set 28 of elongated articles, boards, or products 12, are adapted to be disposed within a grid-type arrangement or array comprising a plurality of horizontally extending rows and a plurality of vertically extending columns. As an example, the second upper set or section 28 of the elongated articles, boards, or products 12 comprises, for example, ten (10) horizontally oriented, vertically stacked rows $R_1$-$R_{10}$, and seven (7) vertically oriented columns $C_1$-$C_7$ disposed in a side-by-side relationship wherein, for example, within each one of the horizontally oriented rows $R_1$-$R_{10}$, the left side surface 18 of each one of the elongated articles, boards, or products 12 is disposed in abutting contact with the right side surface 20 of an adjacent one of the elongated articles, boards, or products 20, and in a similar manner, within each one of the vertically oriented columns $C_1$-$C_7$, a lower or bottom surface 16 of one of each one of the elongated articles, boards, or products 20 is disposed atop an upper surface 14 of the elongated article, board, or product 12 disposed beneath it. In this manner, it can be appreciated that the second upper set or section 28 of the elongated articles, boards, or products 12 comprises seventy (70) elongated articles, boards, or products 12, and that the number of elongated articles, boards, or products 12 comprising the entire arrangement, array, package, or palletized load 10 is one hundred ten (110) elongated articles, boards, or products 12.

It is of course to be realized, however, that other similar arrangements or arrays of the plurality of elongated articles, boards, or products 12, within the overall or entire array, arrangement, package, or palletized load 10 may be implemented. For example, the second upper set or section 28 of the arrangement, array, package, or palletized load 10 may only comprise eight (8) horizontally oriented, vertically stacked rows $R_1$-$R_8$, in which case the total number of elongated articles, boards, or products 12 comprising the entire arrangement, array, package, or palletized load 10 would be ninety-six (96), whereas alternatively still further, the first lower set or section 26 of the arrangement, array, package, or palletized load 10 may comprise forty-eight (48) elongated articles, boards, or products 12 while the second upper set or section 28 of the arrangement, array, package, or palletized load 10 may comprise eight (8) horizontally oriented, vertically stacked rows $R_1$-$R_8$ and eight (8) vertically oriented columns $C_1$-$C_8$, in which case the total number of elongated articles, boards, or products 12 comprising the entire or overall array, arrangement, package, or palletized load 10 would be one hundred twelve (112). Regardless of the particular arrangement of the plurality of elongated articles, boards, or products 12 is selected in forming the overall or entire array, arrangement, package, or palletized load 10, it is to be noted that the combined or composite width W of all of the plurality of elongated articles, boards, or products 12, comprising the second upper set or section 28 of the entire or overall arrangement, array, package, or palletized load 10, is substantially the same as the combined or composite width W of all of the plurality of elongated articles, boards, or products 12 comprising the first lower or foundation section 26 of the entire or overall arrangement, array, package, or palletized load 10.

It is to be further appreciated that, in connection with any one of the particular arrangements or arrays of the plurality of elongated articles, boards, or products 12 comprising the first lower or foundation section 26 of the overall or entire arrangement, array, package, or palletized load 10, as well as in connection with any one of the particular arrangements or arrays of the plurality of elongated articles, boards, or products 12 comprising the second upper section 28 of the overall or entire arrangement, array, package, or palletized load 10 as has been discussed hereinbefore, the disposition or orientation of the plurality of upended elongated articles, boards, or products 12, comprising the first, lower or foundation section 26 of the entire or overall arrangement, array, package, or palletized load 10, will result in such upended elongated articles, boards, or products 12 effectively resisting the bending forces impressed thereon by means of, for example, the forklift apparatus during a lifting or hoisting operation performed upon the overall or entire arrangement, array, package, or palletized load 10. In addition, it is also to be noted that all of the elongated articles, boards, or products 12 comprising the second upper set or section 28 of the entire or overall arrangement, array, package, or palletized load 10 will be properly supported by means of all of the elongated articles, boards, or products 12 comprising the first, lower or foundation set 26 so as to likewise not be adversely affected by means of gravitationally induced bending forces to which the multiplicity of the elongated articles, boards, or products 12, comprising the second upper set or section 28 of the entire or overall arrangement, array, package, or palletized load 10, will nevertheless be subjected to during such handling procedures as well as during shipping, transportation, storage, and the like. In connection with the formation of the finalized entire or overall arrangement, array, package, or palletized load 10, it is also to be appreciated that conventional angle boards or edge protectors, strapping bands, and package wrapping would be used in connection with the securing together of all of the plurality of elongated articles, boards, or products 12, comprising both the first lower or foundation set or section 26, as well as the second upper set or section 28, of the entire or overall arrangement, array, package, or palletized load 10.

It is lastly noted that the longitudinal extents of the plurality of elongated articles, boards, or products 12, comprising the second upper set or section 28 of the entire or overall arrangement, array, package, or palletized load 10, are oriented so as to be disposed parallel to the longitudinal extents of the plurality of elongated articles, products, or boards or products 12, comprising the first, lower set or foundation section 26 of the entire or overall array, arrangement, package, or palletized load 10, as can best be appreciated from FIG. 2. However, it is also possible, under certain circumstances, to dispose or orient the longitudinal extents of the plurality of elongated articles, products, or boards 12, comprising the second upper set or section 28 of the entire or overall arrangement, array, package, or palletized load 10, in such a manner that they will be disposed substantially perpendicular to the longitudinal extents of the plurality of elongated articles, boards, or products 12, comprising the first, lower set or foundation section 26 of the entire or overall arrangement, array, package, or palletized load 10.

For example, such a case may not be possible when each one of the plurality of elongated articles, products, or boards 12, comprising the second upper set or section 28 of the entire or overall arrangement, array, package, or palletized load 10, has a longitudinal extent or length dimension of, for example, twenty feet (20.00') because the footprint of the entire or overall arrangement, array, package, or palletized load 10 would then effectively comprise a square wherein each side thereof would be twenty feet (20.00') long. The lifting, hoisting, shipping, or transportation of such a relatively large package or palletized load might then prove to be problematic. However, if, for example, each one of the plurality of elongated articles, products, or boards 12, comprising the second upper set or section 28 of the entire or overall arrangement, array, package, or palletized load 10, had a longitudinal length dimension or extent of, for example, three feet (3.00') or four feet (4.00'), then such an arrangement or array of the plurality of elongated articles, products, or boards 12, comprising the second upper set or section 28 of the entire or overall arrangement, array, package, or palletized load 10, would be feasible and viable.

Thus, it may be seen that in accordance with the principles and teachings of the present invention, there has been disclosed a new and improved package or palletized load, and a method for forming the same, which comprises the formation of a bottom layer of elongated articles, boards, or products in which a multiplicity of such elongated articles, boards, or products are disposed in a side-by-side abutting array, and in addition, and more particularly, the multiplicity of the elongated articles, boards, or products are not disposed flat, that is, they are not disposed atop each other, but, to the contrary, are effectively disposed in an upended manner so as to be supported by or upon one of the longitudinally extending side surfaces thereof. Additional elongated articles, boards, or products are then stacked or disposed atop the aforenoted bottom layer of such elongated articles, boards, or products in an array comprising multiple rows and columns, wherein longitudinally extending lower or bottom surface portions of such additional elongated articles, boards, or products are seated and supported upon the upper or top, longitudinally extending surfaces successive ones of the elongated articles, boards, or products. In this manner, due to the fact that the aforenoted bottom layer of the elongated lumber products or boards are relatively inflexible along their transverse extents or widths, as defined between the oppositely disposed side surfaces thereof, the multiplicity of stacked elongated articles, boards, or products, disposed within the upper array of rows and columns, are properly supported so as not to be adversely affected by means of gravitational forces to which the multiplicity of elongated articles, boards, or products will be subjected during shipping, handling, transportation, and storage.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A packaging arrangement for a plurality of elongated articles, comprising:
   a plurality of elongated articles wherein each one of said plurality of elongated articles has the configuration of a rectangular parallelepiped comprising an upper surface portion, a lower surface portion, a pair of longitudinally spaced end surface portions, and a pair of laterally spaced side surface portions;
   a first set of said plurality of elongated articles comprising a lower foundation and being respectively disposed in a successive array wherein each one of said plurality of elongated articles comprising said first set of said plurality of elongated articles of said lower foundation is disposed upon one of said laterally spaced side surface portions, and wherein each one of said plurality of elongated articles comprising said first set of said plurality of elongated articles of said lower foundation has said upper and lower surface portions oriented vertically with a lower surface portion of a particular one of said plurality of elongated articles comprising said first set of said plurality of elongated articles of said foundation being disposed in abutting contact with an upper surface portion of an adjacent one of said plurality of elongated articles comprising said first set of said plurality of elongated articles of said foundation so as to provide said foundation with a predetermined width dimension wherein all of said plurality of elongated articles comprising said first set of said plurality of elongated articles of said foundation are disposed parallel to each other; and
   a second set of said plurality of elongated articles forming a grid array comprising horizontally extending rows and vertically extending columns of said second set of said plurality of elongated articles and defining a load that is disposed atop said first set of said plurality of elongated articles comprising said foundation so as to be supported by said plurality of elongated articles comprising said foundation, wherein each one of said second set of said plurality of elongated articles comprising said load has said upper and lower surface portions oriented horizontally with one of said laterally spaced side surface portions of a particular one of said plurality of elongated articles comprising said second set of said plurality of elongated articles of said load being disposed in abutting contact with a laterally spaced side surface portion of an adjacent one of said plurality of elongated articles comprising said second set of said plurality of elongated articles of said load such that said plurality of elongaged articles comprising said second set of said plurality of elongated articles of said load extend in a serial array substantially across said entire predetermined width dimension of said plurality of elongated articles comprising said first set of said plurality of elongated articles of said foundation, and wherein bottommost ones of said second set of said plurality of elongated articles comprising said load of columns and rows respectively have their lower surface portions disposed in contact with, and are supported upon, second ones of said laterally spaced side surface portions of said first set of said plurality of elongated articles comprising said foundation,
   whereby sagging and drooping of all of said plurality of elongated articles comprising said packaging arrangement is significantly reduced.

2. The packaging arrangement as set forth in claim 1, wherein:
   each one of said plurality of elongated articles has a longitudinal extent, as defined between said pair of longitudinally spaced end surface portions, of approximately twenty feet (20.00'), a width dimension, as defined between said pair of laterally spaced side surface portions, of approximately six inches (6.00"), and a depth dimension, as defined between said upper surface portion and said lower surface portion, of approximately one inch (1.00")

3. The packaging arrangement as set forth in claim 2, wherein:
   said first set of said plurality of elongated articles, disposed within said successive array with a lower surface portion of one of said first set of said plurality of elongated articles being disposed in abutting contact with an upper surface portion of an adjacent one of said first set of said plurality of elongated articles, comprises forty (40) elongated articles such that the width of said packaging arrangement is approximately three and one-half feet (3.50")

4. The packaging arrangement as set forth in claim 3, wherein:
   said longitudinal extents of all of said elongated articles comprising said second set of said plurality of elongated articles, disposed atop said first set of said plurality of elongated articles, are disposed parallel to said longitudinal extents of all of said elongated articles comprising said first set of said plurality of elongated articles such that the length of said packaging arrangement is approximately twenty feet (20.00').

5. The packaging arrangement as set forth in claim 1, wherein:
said grid array comprises ten (10) horizontally oriented, vertically stacked rows of said second set of said plurality of elongated articles, and seven (7) vertically oriented columns of said second set of said plurality of elongated articles, wherein said second set of said plurality of elongated articles comprises seventy (70) elongated articles, and said packaging arrangement, comprising said first set of said plurality of elongated articles and said second set of said plurality of elongated articles, comprises one hundred ten (110) elongated articles.

6. The packaging arrangement as set forth in claim 1, wherein:
said grid array comprises eight (8) horizontally oriented, vertically stacked rows of said second set of said plurality of elongated articles, and seven (7) vertically oriented columns of said second set of said plurality of elongated articles, wherein said second set of said plurality of elongated articles comprises fifty-six (56) elongated articles, and said packaging arrangement, comprising said first set of said plurality of elongated articles and said second set of said plurality of elongated articles, comprises ninety six (96) elongated articles.

7. The packaging arrangement as set forth in claim 2, wherein:
said first set of said plurality of elongated articles, disposed within said successive array with a lower surface portion of one of said first set of said plurality of elongated articles being disposed in abutting contact with an upper surface portion of an adjacent one of said first set of said plurality of elongated articles, comprises forty-eight (48) elongated articles.

8. The packaging arrangement as set forth in claim 7, wherein:
said second set of said plurality of elongated articles disposed within said grid array comprises eight (8) horizontally oriented, vertically stacked rows, and eight (8) vertically oriented columns, wherein said second set of said plurality of elongated articles comprises sixty-four (64) elongated articles, and said packaging arrangement, comprising said first set of said plurality of elongated articles and said second set of said plurality of elongated articles, comprises one hundred twelve (112) elongated articles.

9. The packaging arrangement as set forth in claim 1, wherein:
each one of said elongated articles comprises a board of lumber.

10. A palletized load arrangement for a plurality of elongated articles, comprising:
a plurality of elongated articles wherein each one of said plurality of elongated articles has the configuration of a rectangular parallelepiped comprising an upper surface portion, a lower surface portion, a pair of longitudinally spaced end surface portions, and a pair of laterally spaced side surface portions;
a first set of said plurality of elongated articles comprising a lower foundation and being respectively disposed in a successive array wherein each one of said plurality of elongated articles comprising said first set of said plurality of elongated articles of said lower foundation is disposed upon one of said laterally spaced side surface portions, and wherein each one of said plurality of elongated articles comprising said first set of said plurality of elongated articles of said lower foundation has said upper and lower surface portions oriented vertically with a lower surface portion of a particular one of said plurality of elongated articles comprising said first set of said plurality of elongated articles of said foundation being disposed in abutting contact with an upper surface portion of an adjacent one of said plurality of elongated articles comprising said first set of said plurality of elongated articles of said foundation so as to provide said foundation with a predetermined width dimension wherein all of said plurality of elongated articles comprising said first set of said plurality of elongated articles of said foundation are disposed parallel to each other; and
a second set of said plurality of elongated articles forming a grid array comprising horizontally extending rows and vertically extending columns of said second set of said plurality of elongated articles and defining a load that is disposed atop said first set of said plurality of elongated articles comprising said foundation so as to be supported by said plurality of elongated articles comprising said foundation, wherein each one of said second set of said plurality of elongated articles comprising said load has said upper and lower surface portions oriented horizontally with one of said laterally spaced side surface portions of a particular one of said plurality of elongated articles comprising said second set of said plurality of elongated articles of said load being disposed in abutting contact with a laterally spaced side surface portion of an adjacent one of said plurality of elongated articles comprising said second set of said plurality of elongated articles of said load such that said plurality of elongated articles comprising said second set of said plurality of elongated articles of said load extend in a serial array substantially across said entire predetermined width dimension of said plurality of elongated articles comprising said first set of said plurality of elongated articles of said foundation, and wherein bottommost ones of said second set of said plurality of elongated articles comprising said load of columns and rows respectively have their lower surface portions disposed in contact with, and are supported upon, second ones of said laterally spaced side surface portions of said first set of said plurality of elongated articles comprising said foundation,
whereby sagging and drooping of said plurality of elongated articles comprising said palletized load arrangement is significantly reduced.

11. The palletized load arrangement as set forth in claim 10, wherein:
each one of said plurality of elongated articles has a longitudinal extent, as defined between said pair of longitudinally spaced end surface portions, of approximately twenty feet (20.00'), a width dimension, as defined between said pair of laterally spaced side surface portions, of approximately six inches (6.00"), and a depth dimension, as defined between said upper surface portion and said lower surface portion, of approximately one inch (1.00")

12. The palletized load arrangement as set forth in claim 11, wherein:
said first set of said plurality of elongated articles, disposed within said successive array with a lower surface portion of one of said first set of said plurality of elongated articles being disposed in abutting contact with an upper surface portion of an adjacent one of said first set of said plurality of elongated articles, comprises forty (40) elongated articles such that the width of said packaging arrangement is approximately three and one-half feet (3.50").

13. The palletized load arrangement as set forth in claim 12, wherein:
said longitudinal extents of all of said elongated articles comprising said second set of said plurality of elongated articles, disposed atop said first set of said plurality of elongated articles, are disposed parallel to said longitudinal extents of all of said elongated articles comprising said first set of said plurality of elongated articles such that the length of said palletized load arrangement is approximately twenty feet (20.00').

14. The palletized load arrangement as set forth in claim 10, wherein:
said grid arrangement comprises ten (10) horizontally oriented, vertically stacked rows of said second set of said plurality of elongated articles, and seven (7) vertically oriented columns of said second set of said plurality of elongated articles, wherein said second set of said plurality of elongated articles comprises seventy (70) elongated articles, and said packaging arrangement, comprising said first set of said plurality of elongated articles and said second set of said plurality of elongated articles, comprises one hundred ten (110) elongated articles.

15. The palletized load arrangement as set forth in claim 10, wherein:
each one of said elongated articles comprises a board of lumber.

16. A method of forming a packaging arrangement, comprising the steps of:
disposing a first set of a plurality of elongated articles, each one of which has the configuration of a rectangular parallelepiped comprising an upper surface portion, a lower surface portion, a pair of longitudinally spaced end surface portions, and a pair of laterally spaced side surface portions, within a successive array so as to form a lower foundation, wherein each one of said plurality of elongated articles comprising said first set of said plurality of elongated articles of said lower foundation is disposed upon one of said laterally spaced side surface portions, and wherein each one of said plurality of elongated articles comprising said first set of said plurality of elongated articles of said lower foundation has said upper and lower surface portions oriented vertically with a lower surface portion of a particular one of said plurality of elongated articles comprising said first set of said plurality of elongated articles of said foundation being disposed in abutting contact with an upper surface portion of an adjacent one of said plurality of elongated articles comprising said first set of said plurality of elongated articles of said foundation so as to provide said foundation with a predetermined width dimension wherein all of said plurality of elongated articles comprising said first set of said plurality of elongated articles of said foundation are disposed parallel to each other and
disposing a second set of said plurality of elongated articles, similar to said plurality of elongated articles comprising said first set of elongated articles of said foundation, atop said first set of said plurality of elongated articles forming said foundation so as to form a grid array comprising horizontally extending rows and vertically extending columns of said second set of said plurality of elongated articles and defining a load that is to be supported by said plurality of elongated articles comprising said foundation, wherein each one of said second set of said plurality of elongated articles comprising said load has said upper and lower surface portions oriented horizontally with one of said laterally spaced side surface portions of a particular one of said plurality of elongated articles comprising said second set of said plurality of elongated articles of said load being disposed in abutting contact with a laterally spaced side surface portion of an adjacent one of said plurality of elongated articles comprising said second set of said plurality of elongated articles of said load such that said plurality of elongated articles comprising said second set of said plurality of elongated articles of said load extend in a serial array substantially across said entire predetermined width dimension of said plurality of elongated articles comprising said first set of said plurality of elongated articles of said foundation, and wherein bottommost ones of said second set of said plurality of elongated articles comprising said load of columns and rows respectively have their lower surface portions disposed in contact with, and are supported upon, second ones of said laterally spaced side surface portions of said first set of said plurality of elongated articles comprising said foundation,
whereby sagging and drooping of said plurality of elongated articles comprising said packaging arrangement is significantly reduced.

17. The method of forming a packaging arrangement as set forth in claim 16, further comprising the step of:
placing forty (40) of said elongated articles within said first set of said plurality of elongated articles; and
forming said grid arrangement of said plurality of elongated articles such that said grid arrangement comprises ten (10) horizontally oriented, vertically stacked rows of said second set of said plurality of elongated articles, and seven (7) vertically oriented columns of said second set of said plurality of elongated articles, wherein said second set of said plurality of elongated articles comprises seventy (70) elongated articles, and said packaging arrangement, comprising said first set of said plurality of elongated articles and said second set of said plurality of elongated articles, comprises one hundred ten (110) elongated articles.

18. The method as set forth in claim 16, further comprising the step of:
forming all of said elongated articles from boards of lumber.

19. The method as set forth in claim 16, further comprising the step of:
disposing forty (40) of said first set of said plurality of elongated articles, within said successive array with a lower surface portion of one of said first set of said plurality of elongated articles being disposed in abutting contact with an upper surface portion of an adjacent one of said first set of said plurality of elongated articles, such that the width of said packaging arrangement is approximately three and one-half feet (3.50').

20. The method as set forth in claim 16, further comprising the step of:
arranging saiud elongated articles comprising said second set of said plurality of elongated articles, disposed atop said first set of said plurality of elongated articles, parallel to said longitudinal extents of all of said elongated articles comprising said first set of said plurality of elongated articles, such that the length of said packaging arrangement is approximately twenty feet (20.00').

* * * * *